(12) United States Patent
Kruth et al.

(10) Patent No.: US 10,326,143 B2
(45) Date of Patent: Jun. 18, 2019

(54) FUEL CELL

(75) Inventors: Angela Kruth, Old Aberdeen (GB);
Malcolm John Todd, Aberdeen (GB);
Donald Elliot Macphee, Old Aberdeen (GB); Richard Peter Kerwin Wells, Old Aberdeen (GB)

(73) Assignee: UNIVERSITY COURT OF THE UNIVERSITY OF ABERDEEN (GB)

( * ) Notice: Subject to any disclaimer, the term of this patent is extended or adjusted under 35 U.S.C. 154(b) by 986 days.

(21) Appl. No.: 13/503,181

(22) PCT Filed: Oct. 22, 2010

(86) PCT No.: PCT/GB2010/051783
§ 371 (c)(1),
(2), (4) Date: Jul. 24, 2012

(87) PCT Pub. No.: WO2011/048429
PCT Pub. Date: Apr. 28, 2011

(65) Prior Publication Data
US 2012/0282542 A1 Nov. 8, 2012

(30) Foreign Application Priority Data

Oct. 22, 2009 (GB) .................................. 0918547.1

(51) Int. Cl.
*H01M 4/86* (2006.01)
*H01M 4/90* (2006.01)
(Continued)

(52) U.S. Cl.
CPC ....... *H01M 4/8605* (2013.01); *H01M 4/8647* (2013.01); *H01M 4/9016* (2013.01); *H01M 4/921* (2013.01); *H01M 4/926* (2013.01); *H01M 8/0215* (2013.01); *H01M 8/0221* (2013.01); *H01M 2004/8684* (2013.01); *H01M 2008/1095* (2013.01)

(58) Field of Classification Search
None
See application file for complete search history.

(56) References Cited

FOREIGN PATENT DOCUMENTS

| JP | 2003-272660 | * | 9/2003 | ............. H01M 8/02 |
| JP | 2003/272660 | | 9/2003 | |

(Continued)

OTHER PUBLICATIONS

Indian Patent Office, Examination Report for Indian Patent Application No. 4472/DELNP/2012, dated Nov. 11, 2017.

*Primary Examiner* — Maria Laios
*Assistant Examiner* — Angela J Martin
(74) *Attorney, Agent, or Firm* — Renner Kenner Greive Bobak Taylor & Weber

(57) ABSTRACT

An anode assembly for a fuel cell, the anode assembly having an anode catalyst component, said anode catalyst component comprising both a noble metal catalyst and a photo-catalyst, and said photo-catalyst being provided for enhancing contaminant carbon monoxide oxidation upon irradiation by incident radiation; the anode assembly further comprising a current collecting means electrically coupled to the anode catalyst component and being porous to said incident radiation and fuel for the fuel cell; and a flow plate incorporating a light source for providing incident radiation.

11 Claims, 2 Drawing Sheets

(51) Int. Cl.
*H01M 4/92* (2006.01)
*H01M 8/02* (2016.01)
*H01M 8/0215* (2016.01)
*H01M 8/0221* (2016.01)
*H01M 8/1018* (2016.01)

(56) References Cited

FOREIGN PATENT DOCUMENTS

| | | | | |
|---|---|---|---|---|
| JP | 2004-178855 | * | 6/2004 | ............... H01M 8/06 |
| JP | 2004/178855 | | 6/2004 | |
| WO | WO 2004/079847 | * | 9/2004 | ............... H01M 8/06 |
| WO | WO2004079847 | | 9/2004 | |
| WO | WO 2005/060038 | * | 6/2005 | ............... H01M 8/10 |
| WO | WO2005060038 | | 6/2005 | |
| WO | WO 2010024447 A2 | * | 3/2010 | ................. C01F 5/04 |

* cited by examiner

FUEL CELL

The present invention relates to fuel cell technology.

In this connection, fuel cells are electrochemical cells in which an energy change, resulting from a fuel oxidation reaction, is converted into electrical energy. In this respect, a fuel cell consists of three principal components, namely an anode, a proton conducting membrane, and a cathode. Fuel in the form of, for example, hydrogen or an organic material, is delivered into the anode chamber of the fuel cell, where it is oxidised. Hydrogen, used directly as the fuel or derived from the breakdown of the organic material, then dissociates at the anode of the fuel cell into protons and electrons. The protons are conducted through the proton conducting membrane to the cathode, whilst the electrons travel around an external load circuit to the cathode, thus creating a current output for the cell. An oxidant in the form of air, oxygen enriched air, or oxygen itself, is delivered to the cathode chamber, where it is reduced by means of a chemical reaction with the protons and electrons, to form water.

Some fuel cells require to be operated at high temperatures (e.g. between 600 and 1000° C.) in order to break down fuel in the manner required. However, heating up to such high temperatures is not appropriate for certain applications where a fast start time is required, for example when the fuel cell is used to power a vehicle. Additionally, operation at high temperatures wears out the fuel cell components and the gas sealing quickly and so high temperature fuel cells tend not to be particularly durable.

Low temperature fuel cells, for example Proton Exchange Membrane Fuel Cells (PEMFCs), Direct Methanol Fuel Cells (DMFCs) and Direct Ethanol Fuel Cells (DMFCs) are typically operated at temperatures ranging from room temperature up to 80° C., although some are capable of operation up to a temperature of 200° C. Such low temperature fuel cells have the advantage of short start-up times and long durability. Additionally, PEMFCs have the advantage of being generally smaller and lighter than high temperature fuel cells.

Oxidation of hydrogen or hydrocarbons at the anode of a PEMFC at low temperatures can be assisted by a noble metal catalyst (typically platinum) provided at the anode. However, a problem associated with PEMFCs is the strong adsorption of the contaminant carbon monoxide at the catalyst-anode surface. Carbon monoxide is derived from the breakdown of organic fuels such as methanol or ethanol in the anode chamber, or from carbon monoxide contaminated hydrogen as hydrogen derived from reformed hydrocarbons can contain more than 100 ppm carbon monoxide. In high temperature fuel cells, such carbon monoxide is usually readily oxidised to carbon dioxide, which is easily desorbed from the electrode surface. However, as oxidisation of carbon monoxide to carbon dioxide is less efficient at low temperatures, carbon monoxide is adsorbed at the catalyst-anode surface of low temperature fuel cells, thus blocking the active sites for the hydrogen oxidation reaction at the anode. Although noble metal catalysts such as platinum effectively catalyse the dissociation of hydrogen, their functionality with regard to the oxidation of carbon monoxide is limited. The blocking of the active sites for hydrogen oxidation leads to a significant decrease in cell performance over time.

Various methods for the removal of carbon monoxide from the anode of a low temperature PEMFC have been explored.

One such method has involved pulsing the cell voltage during operation. However this method was found to disrupt the energy output from the cell, which is not desirable if a constant energy output is required.

Another method has involved bleeding air into the anode compartment. However this significantly reduces the open cell potential and therefore decreases cell performance.

Yet another approach has been to use a bimetallic catalyst comprising a noble metal and a non-noble metal, such as an alloy of platinum and ruthenium. However this was found not to prevent electrode poisoning at carbon monoxide concentrations greater than 25 ppm. Other bimetallic or ternary catalysts, such as Pt/Ni, Pt/Co, Pt/Ru/Ni and Pt/Ni/Co, have been investigated. However, in such systems the non-noble alloying metal has to display a number of characteristics: as Nafion® (a copolymer of tetrafluoroethylene and perfluoropolyether sulfonic acid) is often used as an electrolyte material, thus creating a strong perfluorosulphonic acidic environment, the non-noble metal must be stable in this environment; also the non-noble metal must possess low activation energies for the water dissociation reaction and the formation of COOH from adsorbed CO and adsorbed OH.

Despite the methods discussed above, there remains a need to provide fuel cells, in particular PEMFCs, DMFCs and DEFCs, that can increase the efficiency of known fuel cells by providing an improved level of tolerance to the contamination of the anode by carbon monoxide.

In view of the above, the present Applicant has been researching ways to increase the efficiency of a fuel cell such as a PEMFC, a DMFC, or a DEFC through a reduction in the amount of contaminant carbon monoxide present at the anode.

According to a first aspect of the present invention there is provided an anode assembly for a fuel cell, the anode assembly having an anode catalyst component, said anode catalyst component comprising both a noble metal catalyst and a photo-catalyst, and said photo-catalyst being provided for enhancing contaminant carbon monoxide oxidation upon irradiation by incident radiation; the anode assembly further comprising a current collecting means electrically coupled to the catalyst component and being porous to said incident radiation and fuel for the fuel cell; and a flow plate incorporating a light source for providing incident radiation.

Current low temperature fuel cells rely on the use of very pure hydrogen, or fuels that have been pre-purified, as the source of fuel. The provision of a photo-catalyst for enhancing contaminant carbon monoxide oxidation allows for the creation of a low temperature fuel cell with a carbon monoxide tolerant anode assembly. Such a cell can thus utilise hydrocarbon gas or liquids such as methanol or ethanol as the source of fuel without the need for purifiers and/or reformers. This reduces the bulk and operating cost of such low temperature fuel cells. The precious metal catalyst loading is also reduced, which significantly decreases fuel cell costs. In addition, the arrangement of the present invention exhibits an increased cell efficiency when used in a DEFC.

The particular arrangement of the fuel cell of the present invention affords the advantage that the illumination source is in close approximation to the catalyst layer as opposed to concepts where an external illumination source is employed. Therefore, low intensity light technologies can be used, which greatly reduces cost. In addition, the planar geometric configuration of the thin layer light source ensures an efficient and homogenous illumination of the catalyst layer which is not the case for concepts with external illumination.

Fuel cells according to the present invention may find application in a number of devices where carbon contaminated hydrogen or hydrocarbon fuels are presently used as fuels for energy generation. Possible uses are for complementation or replacement of batteries, diesel generators or combustion engines in small portable devices, light and heavy-duty vehicles, and back-up or remote stationary power devices, thus allowing the use of cells in markets such as portable electronics, transport and small stationary power generation.

The light source may be provided as a planar element, and may be powered directly by the fuel cell. Advantageously, the light source is an organic light emitting diode (OLED).

Providing the light source as a planar element allows the fuel cell and bipolar plate to be of the same dimension as that of conventional components, without compromising its compactness by additional bulkiness.

Conveniently, at least a section of the flow plate may be porous to radiation from said light source.

Conveniently, the flow plate may have a flow guide surface for directing fuel around the anode, with the flow guide surface being provided between the anode and the light source.

Advantageously, the flow plate may be made of acrylic or glass.

The current collecting means may comprise a metallic mesh. Alternatively, the current collecting means may comprise a plurality of substantially parallel metallic wires or strands.

In each arrangement of the current collecting means, the mesh, wires or strands may comprise a gold-coated material, titanium, nickel or chromium, or a platinum-coated material.

Alternatively, the current collecting means may comprise a metallic foam such as nickel foam.

As a further alternative, the current collecting means may comprise a metal-coated or carbon-coated polymer cloth.

Advantageously, the noble metal catalyst may comprise platinum.

Advantageously, the photo-catalyst may comprise a photo-catalytically active metal oxide, or a material derived from a photo-catalytically active metal oxide. The metal oxide may be tungsten oxide, titanium oxide or iron oxide.

According to a further aspect of the present invention there is provided a flow plate for use in an anode assembly according to the first aspect of the invention.

According to a further aspect of the present invention there is provided a flow plate for use in a fuel cell comprising a flow guide surface for directing fuel around a conducting element, wherein said flow plate has incorporated therein a planar light source for radiating light through the flow plate towards said conducting element.

Conveniently, the flow plate further comprises a recess for housing said light source. Further, at least a section of the flow plate may be porous to light radiated by the light source.

Advantageously, the flow plate may be partially or entirely made of acrylic or glass. The flow plate may have a thickness in the range of 1 mm to 15 mm.

According to a further aspect of the present invention, there is provided an anode assembly for a fuel cell, the assembly comprising an anode catalyst component, said anode catalyst component comprising a noble metal catalyst and a photo-catalyst in intimate contact, and said photo-catalyst being provided for enhancing contaminant carbon monoxide oxidation upon irradiation by incident light radiation; the anode assembly further comprising a current collecting means electrically coupled to the catalyst component and being porous to said incident radiation and fuel for the fuel cell, said current collecting means comprising an arrangement of metallic wires in contact with a surface of said anode catalyst component which faces a flow plate incorporating a light source.

An embodiment of the present invention will now be described, by way of illustration only, with reference to the accompanying drawings in which:—

Figure 2:
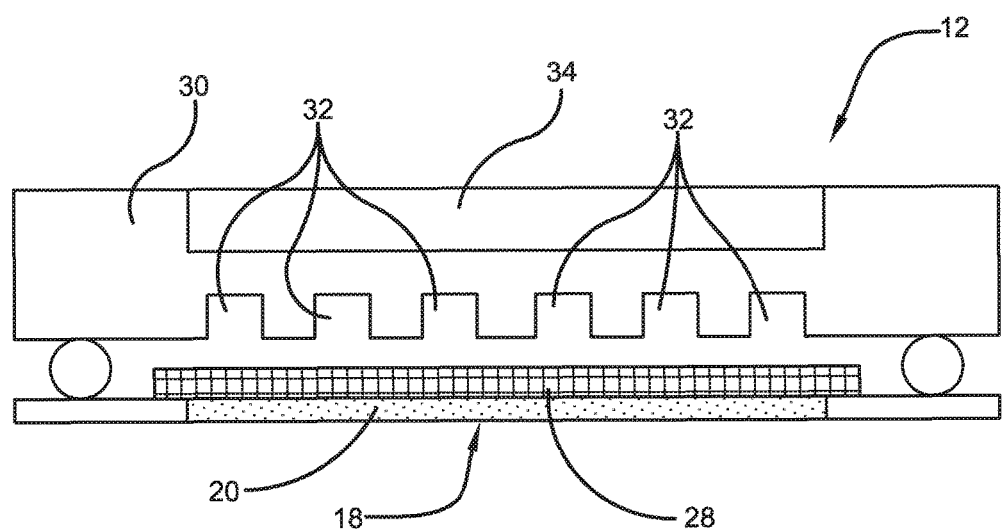
FIG. 2 shows the anode assembly of the fuel cell of FIG. 1.
Figure 3:
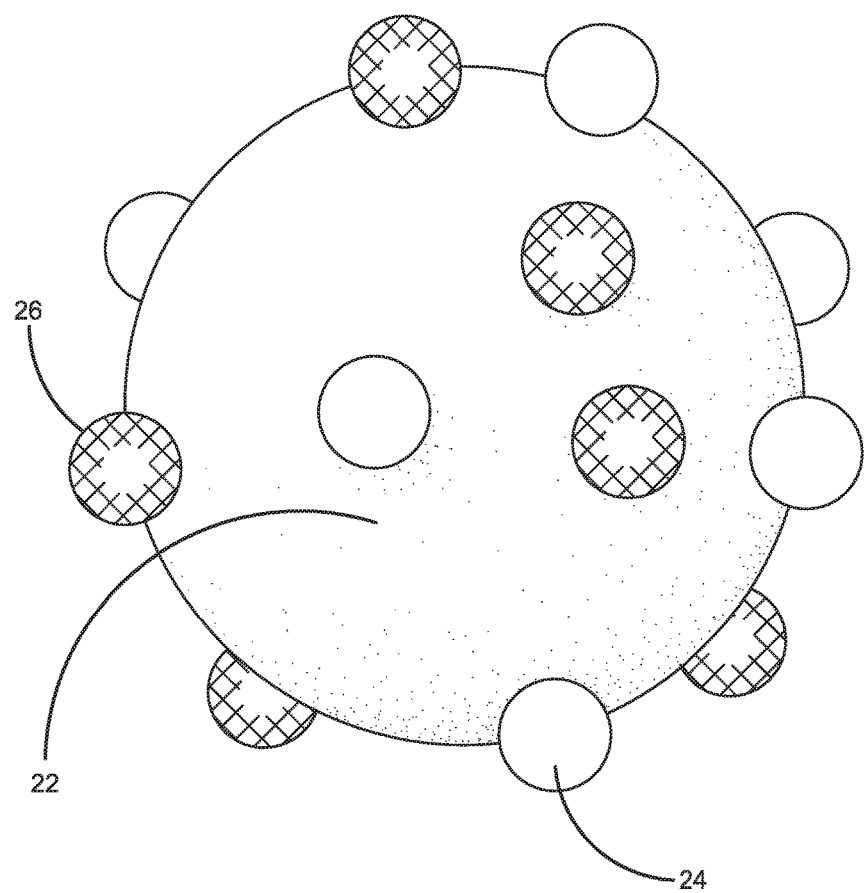

FIG. 3 representation of a particle which may be used to form the catalyst layer of FIG. 2.

Figure 1:
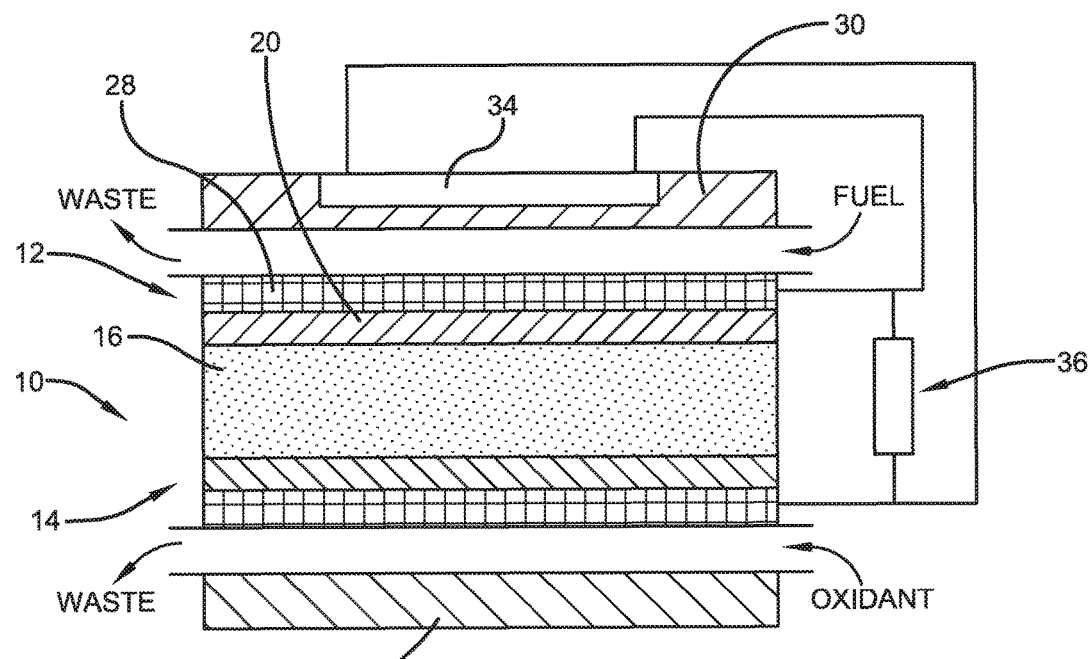
FIG. 1 shows the general configuration of a fuel cell according to an embodiment of the present invention.

The general configuration of a fuel cell 10 according to the present invention can be seen in FIG. 1, with the detailed structure of the anode chamber 12 shown in FIG. 2. Referring firstly to FIG. 1, the fuel cell 10 comprises an anode chamber 12 and a cathode chamber 14, with a polymer electrolyte membrane 16 located between and in contact with both the anode chamber 12 and the cathode chamber 14. The polymer electrolyte membrane (PEM) layer 16 is conductive to protons, and preferably is formed from Nafion®, which is a copolymer of tetrafluoroethylene and perfluoropolyether sulfonic acid.

In FIG. 2, the surface of the anode chamber 12 which provides the anode assembly/PEM layer interface is shown by the reference numeral 18.

As can be seen from FIG. 2, the anode chamber 12 comprises a gas permeable catalyst layer 20, such that the catalyst layer 20 is in fluid communication with the PEM layer 16 (see FIG. 1). The catalyst layer 20 comprises a platinum catalyst and a tungsten oxide visible light responsive photo-catalyst. More specifically, the catalyst layer is preferably formed from molecules of the form shown in FIG. 3. That is, the catalyst layer comprises a composite consisting of tungsten oxide photo-catalyst nanoparticles 26 and nano-sized platinum catalyst 24 on a carbon support 22, with a tungsten oxide to platinum mass ratio in the range of 1:99 to 99:1, preferably in the range of 70:30 to 95:5, and most preferably in the range of 80:20 to 90:10.

Provided immediately adjacent the catalyst layer 20, and in electrical communication therewith, is a current collecting means, in this embodiment in the form of a wire mesh 28 of gold plated copper.

A flow plate 30 is provided on the outer most surface of the anode chamber 12. The flow plate 30 is shaped to form a plurality of flow channels 32, which act to direct fuel into and around the anode chamber 12. The outer portion of the flow plate 30 is provided with an organic light emitting diode (OLED) light source 34. The flow plate 30 is formed from acrylic and is at least in certain regions transparent to the radiation provided by the OLED 34.

In use, fuel gas is delivered to the anode chamber 12, with the flow of fuel being directed by the flow plate 30. The fuel may be in the form of pure hydrogen, or a hydrocarbon fuel such as methanol. The fuel is able to pass through the wire mesh 28 and thus into contact with the catalyst layer 20. The hydrogen contained in the fuel is then catalytically split into protons and electrons in the presence of the platinum catalyst, in accordance with Equation 1:

$$2H_2 \rightarrow 4H^+ + 4e^-. \tag{1}$$

Once split, the protons permeate through the catalyst layer 20 and the PEM layer 16 to gather at the cathode 14.

At the cathode side of the fuel cell 10, an oxidant such as air, oxygen enriched air, or pure oxygen is delivered to the cathode chamber 14, with the flow of oxidant being directed by a flow plate 38. This oxidant reacts with the protons which have permeated through the PEM layer 16 and have gathered at the cathode 14, to form water in accordance with Equation (2):

$$4H^+ + 4e^- + O_2 \rightarrow 2H_2O. \qquad (2)$$

Meanwhile, the electrons are collected by the wire mesh 28 and delivered to the external load circuit 36. This flow of electrons provides the current which forms the energy output of the fuel cell 10.

As described above, contaminant carbon monoxide may be present in the anode chamber 12 as a result of the breakdown of the fuel, or from the use of carbon monoxide contaminated hydrogen as the fuel. In order to prevent the adsorption of this carbon monoxide into the anodic catalyst layer 20, which would lead to the blocking of active sites for the hydrogen oxidation reaction of Equation 1, the anode chamber is irradiated by the OLED 34. The OLED 34 can be powered at least in part by means of the current flow in the external load circuit 36, and the resultant irradiation is able to pass through the transparent flow plate 30 and past the wire mesh 28 to the catalyst layer 20. The contaminant carbon monoxide is photo-catalytically oxidised to form carbon dioxide, once the tungsten oxide in the catalyst layer has been irradiated in this way. The resultant carbon dioxide can then be easily desorbed from the anode surface, and is able to pass back through the wire mesh such that it can be exhausted from the cell 10.

A number of cells 10 according to the present invention may be provided in a stack, so as to provide enough energy for the particular application in question.

It has been found that the efficiency of the fuel cell according to the present invention can be optimised by controlling the ratio of noble-metal catalyst to photo-catalyst at the anode. For a composite catalyst layer consisting of photocatalyst nanoparticles and nano-sized platinum catalyst on a carbon support, a tungsten oxide to platinum mass ratio in the range of 70:30 to 95:5 has been observed to give good performance, with the most optimal range being 80:20 to 90:10 for methanol oxidation. An optimum Nafion® loading of the catalyst in the electrode layer also greatly increases fuel cell efficiency, with possible Nafion® loadings between 2% and 30%, most preferably between 5% and 20%, for methanol oxidation. The electrode layer thickness is preferably between 1 mm and 100 mm, with an optimal layer thickness of 5 mm to 20 mm.

It will be understood that the illustrated embodiment described herein shows an application of the invention in one form only for the purposes of illustration. In practice the invention may be applied to many different configurations.

For example, the platinum catalyst could comprise any other noble metal, and may be combined with one or more non-noble metal to form, for example, a bi-metallic or tri-metallic catalyst such as Pt/Ru, Pt/Ni, Pt/Co, Pt/Ru/Ni or Pt/Ni/Co. Also, the photo-catalyst could comprise any other photo-catalytically active metal oxide such as tungsten oxide, titanium oxide or iron oxide, or compounds derived from tungsten oxide, titanium oxide or iron oxide.

The porosity of the anode is preferably in the range 50% to 80%, with the preferred porosity being in the range 60% to 70%. Most preferably, the porosity of the anode is around 65%.

The average particle size of the photo-catalyst particles is normally less than 100 nm. In this connection, the average particle size is typically between 5 and 50 nm, and is preferably in the range 10 to 20 nm.

Further, instead of comprising particles of the form shown in FIG. 3, the catalyst layer 20 could be formed from a laminated arrangement of carbon, noble metal catalyst, and metal oxide photo-catalyst.

Furthermore, the wire mesh 28 may be replaced by a plurality of metal wires or strands, preferably substantially parallel, which would obviate any problems with conductivity whereby cross-over points may compromise the contact of the mesh with the catalyst layer. The wire mesh or metal wires or strands may be made from any other suitable electron-conducting metal or metal alloy, such as those comprising titanium or platinum. The main requirements of the mesh or metal wires or strands are that they are conductive, and allow the passage of gas (both fuel and waste products) and light. As a further alternative, the mesh or metal wires or strands could be replaced by a metal foam such as a nickel-based foam.

The OLED may be replaced by another source of visible radiation for the photo-catalyst layer. The irradiation may be provided in a pulsed manner to minimise the power drain from the fuel cell. In any event, the radiation source should be uniform over the surface of the photo-catalyst in order to maximise the photo-catalytic effect. The power for the light source may be provided externally of the cell.

In addition, the flow plate 30 may be made of any other suitable material that is transparent to the incident radiation.

The invention claimed is:

1. An anode assembly for a fuel cell, the anode assembly having an anode catalyst component, said anode catalyst component comprising both a noble metal catalyst and a photo-catalyst, said photo-catalyst being provided for enhancing contaminant carbon monoxide oxidation upon irradiation by incident radiation; the anode assembly further comprising a current collecting means electrically coupled to the anode catalyst component and being porous to said incident radiation and fuel for the fuel cell; wherein the anode catalyst component and current collecting means are provided in an anode chamber; the assembly further comprising a flow plate comprising a recess for housing a light source for providing incident radiation, at least a section of the flow plate being porous to light radiation for enabling irradiation of said photo-catalyst through said flow plate, the flow plate having a flow guide surface shaped to form a plurality of channels for directing fuel within the anode chamber.

2. An anode assembly according to claim 1, wherein the light source is provided as a planar element.

3. An anode assembly according to claim 1, wherein the light source is powered directly by the fuel cell.

4. An anode assembly according to claim 1, wherein the flow guide surface is provided between the current collecting means and the light source.

5. An anode assembly according to claim 1, wherein the flow plate is made of acrylic.

6. An anode assembly according to claim 1, wherein the current collecting means comprises a metallic mesh, a plurality of substantially parallel metallic wires or strands, a metallic foam, or a metal-coated or carbon-coated polymer cloth.

7. An anode assembly according to claim 6 wherein the mesh, wires or strands comprise a gold-coated material, or comprise titanium, nickel or chromium, or comprise a platinum-coated material.

8. An anode assembly according to claim 6, wherein the metallic foam comprises nickel foam.

9. An anode assembly according to claim 1, wherein the photo-catalyst comprises tungsten oxide, titanium oxide or iron oxide.

10. A flow plate for use in an anode assembly according to claim 1.

11. An anode assembly for a fuel cell, the assembly comprising an anode catalyst component, said anode catalyst component comprising a noble metal catalyst and a photo-catalyst in intimate contact, and said photo-catalyst being provided for enhancing contaminant carbon monoxide oxidation upon irradiation by incident light radiation; the anode assembly further comprising a current collecting means electrically coupled to the catalyst component and being porous to said incident radiation and fuel for the fuel cell, said current collecting means comprising an arrangement of metallic wires in contact with a surface of said anode catalyst component which faces a flow plate comprising a recess for housing a light source, the flow plate flow plate having a flow guide surface shaped to form a plurality of channels for directing fuel within the anode assembly.

* * * * *